Figure 4:
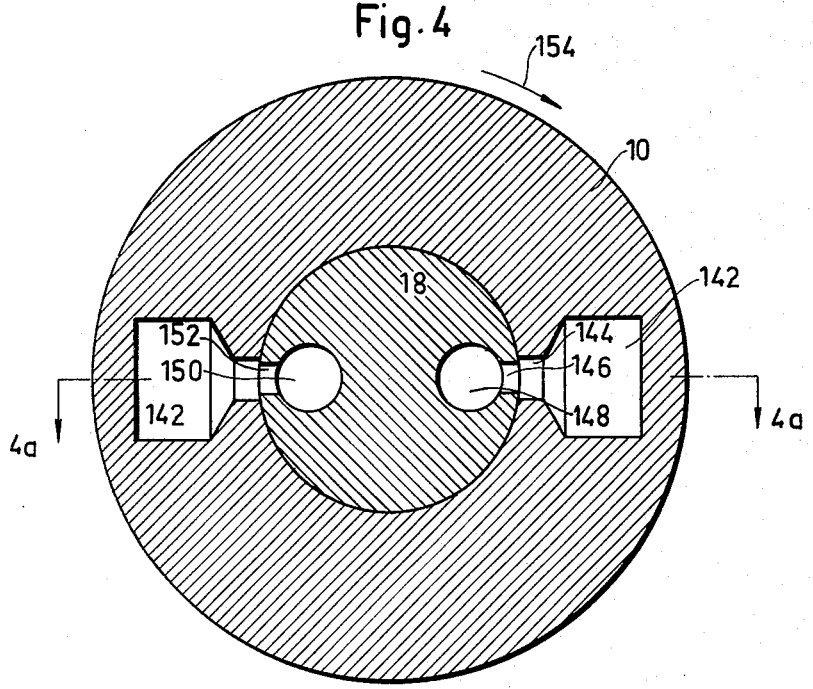

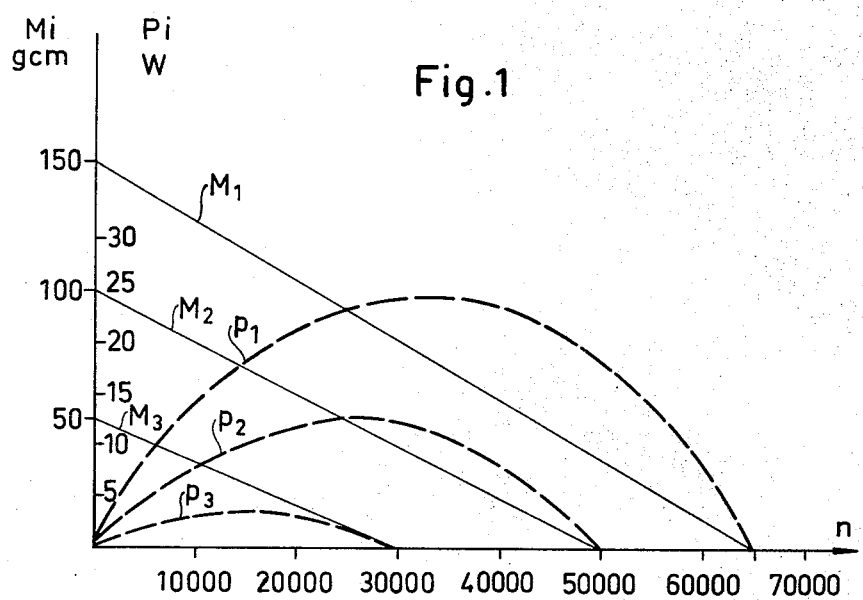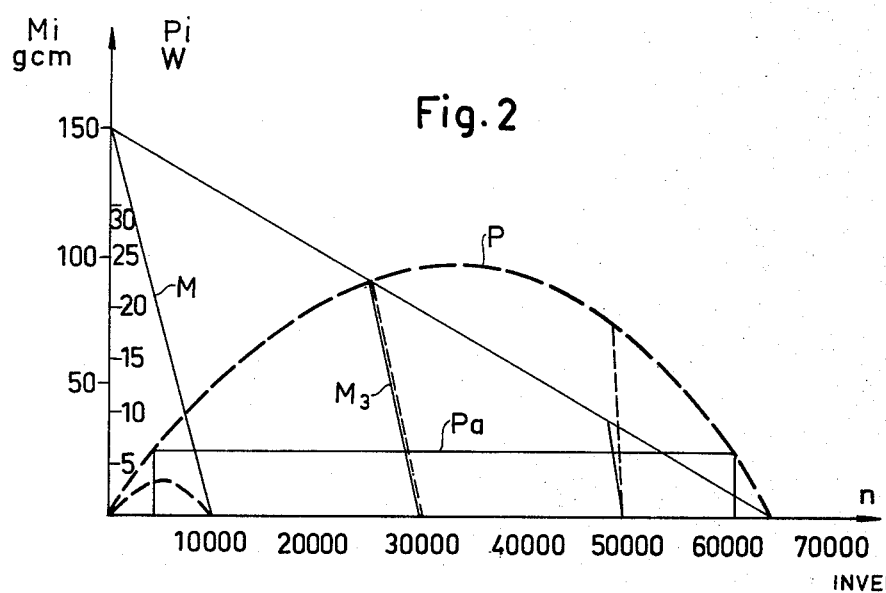

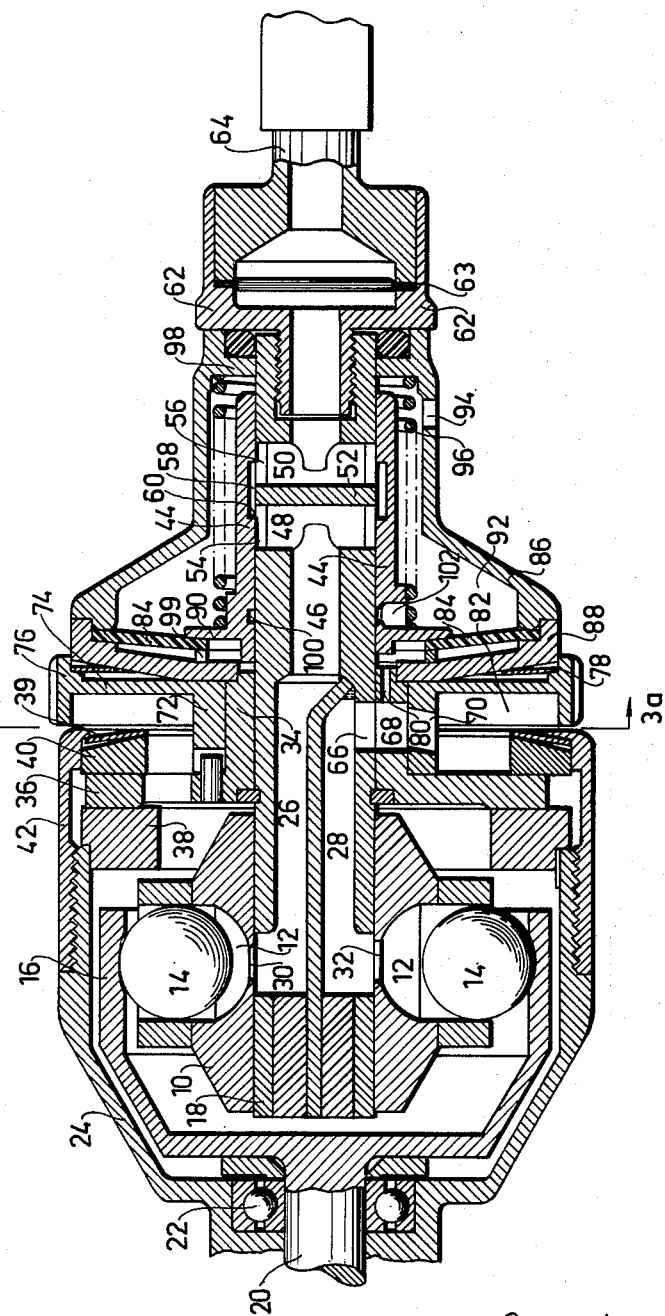

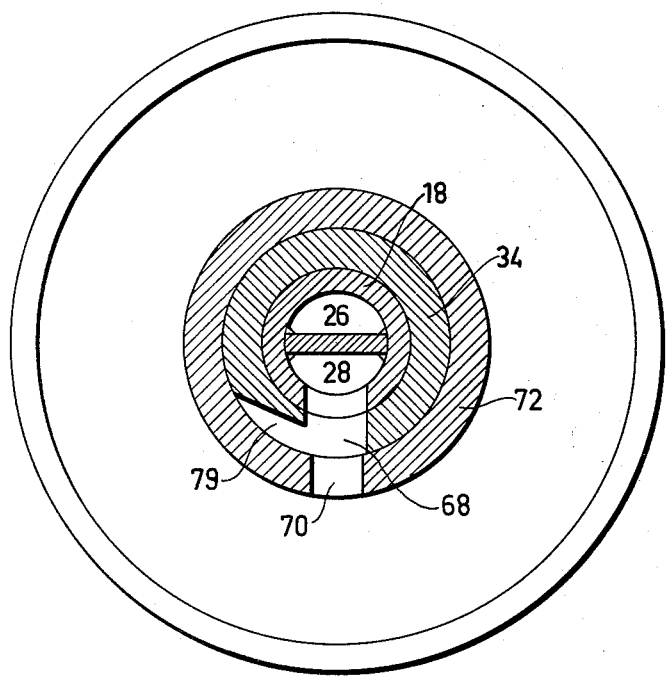

April 12, 1966 G. L. GRANSTEN ETAL 3,245,322
SPEED CONTROL DEVICE FOR FLUID ACTUATED MOTORS
Filed March 18, 1963 8 Sheets-Sheet 4

INVENTORS
GUNNAR LENNART GRANSTEN
GUSTAF ERIK BJÖRKLUND

BY Young + Thompson

ATTORNEYS

April 12, 1966     G. L. GRANSTEN ETAL     3,245,322
SPEED CONTROL DEVICE FOR FLUID ACTUATED MOTORS
Filed March 18, 1963                                                 8 Sheets-Sheet 5
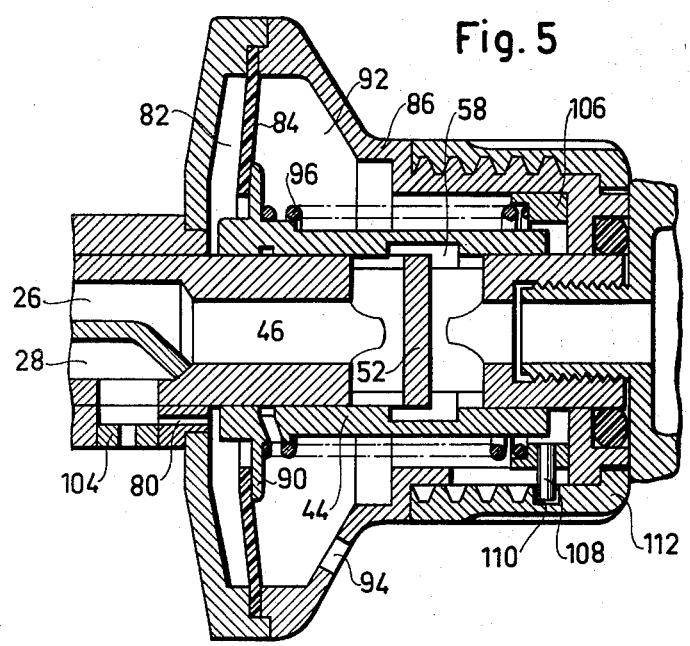
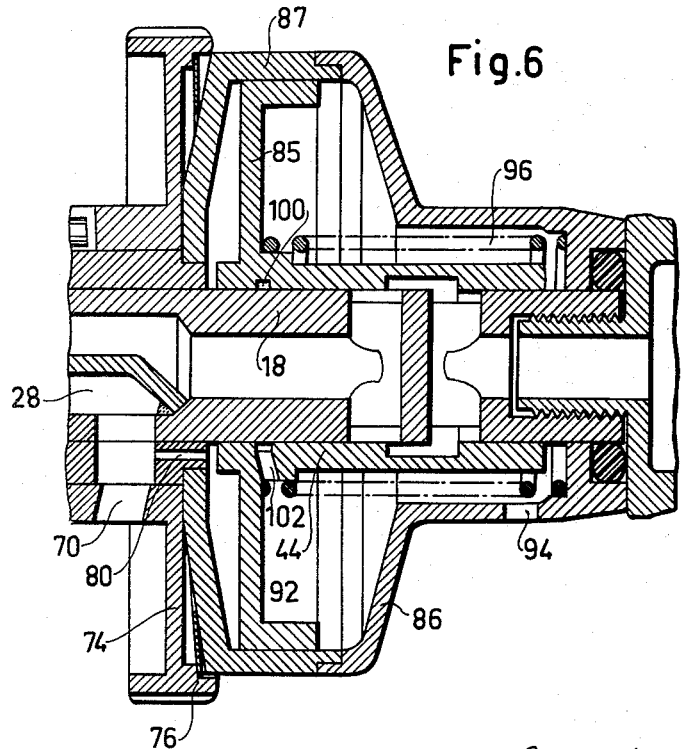
INVENTORS
GUNNAR LENNART GRANSTEN
GUSTAF ERIK BJÖRKLUND
BY
ATTORNEYS

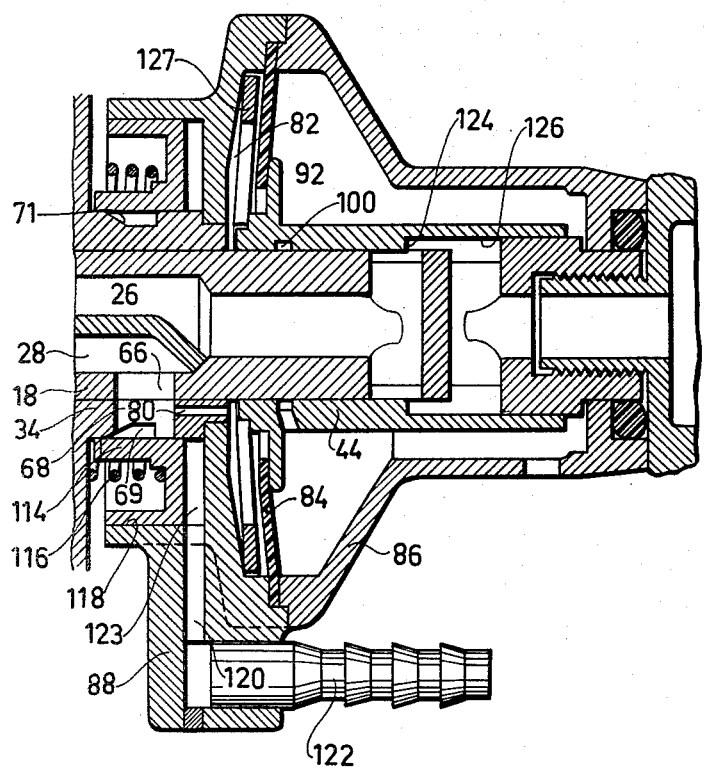

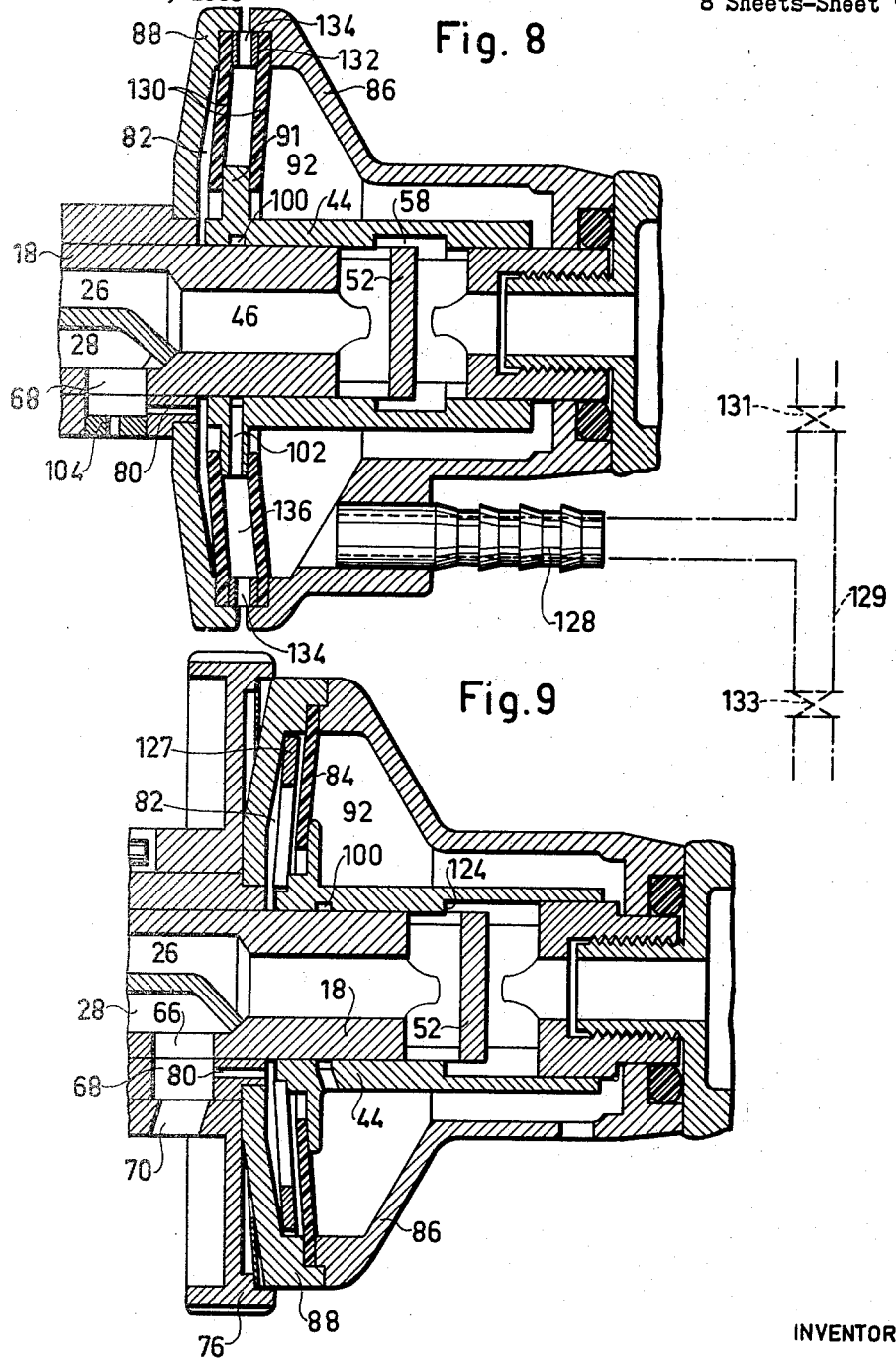

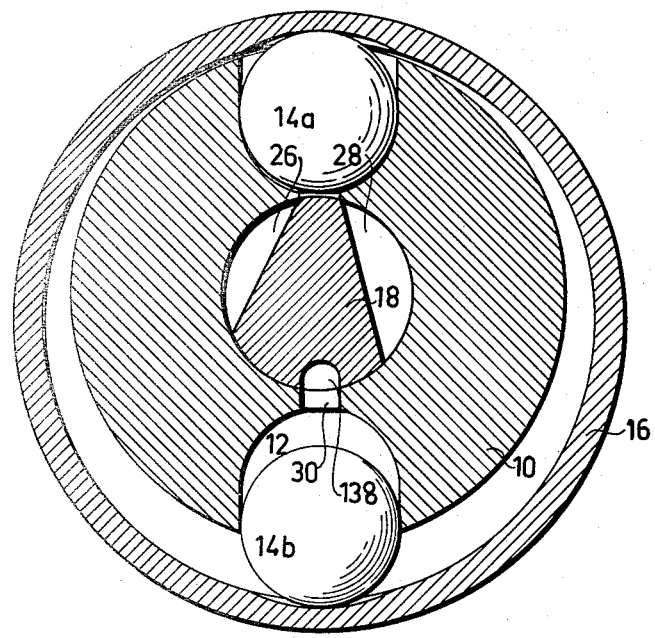
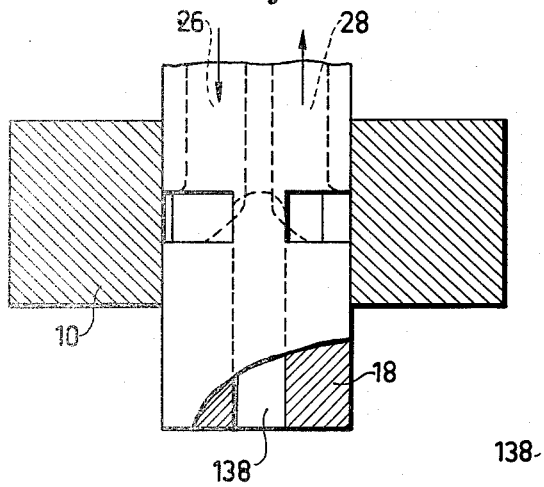
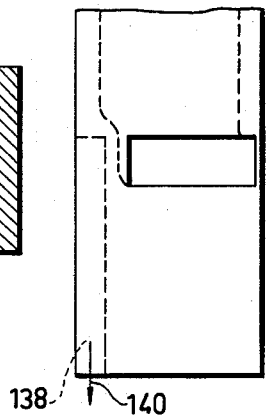

United States Patent Office 3,245,322
Patented Apr. 12, 1966

3,245,322
SPEED CONTROL DEVICE FOR FLUID
ACTUATED MOTORS
Gunnar Lennart Gransten, Lannersta, and Gustaf Erik
Björklund, Stockholm, Sweden, assignors to Rederi AB
Soya, Hagersten, Sweden, a corporation of Sweden
Filed Mar. 18, 1963, Ser. No. 265,957
Claims priority, application Sweden, Apr. 6, 1962,
3,860/62
2 Claims. (Cl. 91—204)

Conventional high-speed motors for dental purposes driven by air under pressure are sensitive to load variations. An increased load on a tool, such as a boring tool, driven by an air motor of the kind indicated often results in a considerable decrease of speed. The increased torque required at the decreased speed becomes soon too low so that the speed will be too low for the work to be performed and the motor may even come to a standstill. The object of the present invention is to eliminate this inconvenience and to provide a speed control device which in general can be used in piston motors driven by a medium under pressure and offers special advantages in connection with piston motors for dental purposes driven by compressed air. The object of the invention is not only to provide a control device for maintaining the speed substantially constant at varying load, but also to render possible adjustment of the speed to predetermined values in idling operation.

In accordance with the invention, control operation is carried into effect, in a manner known per se, by actuation of an inlet valve for the medium under pressure by means of which the motor is driven, the inlet valve being adjusted in response to a magnitude sensitive to variations of the speed of the motor.

In its broadest aspect the invention is characterized in that said magnitude is constituted by the pressure of an amount of gas stream in which the onward flow of gas per unit of time is proportional to the speed. As a result thereof, simple control members can be used which without complications may be devised both for maintaining constant the adjusted speed and for adjusting the idling speed. In addition, simple means can be used for direct control of the inlet valve as well as for remote control.

In a most simple arrangement the gas stream used for control may consist of the working medium discharged from the motor, but it is also possible to provide the motor with means acting as a cellular wheel or sluice wheel for admitting per unit of time an amount of working medium proportional to the speed and to drive the control pressure from said working medium. Further, it is possible to produce the gas stream proportional to the speed by means of a compressor or pump drivably connected to the motor so as to represent variations of the motor speed.

In order to maintain the speed at a constant value, the member operating the inlet valve may be acted upon, in addition to the pressure of the speed-sensitive gas stream, by a counter force such as spring, gas cushion or similar means balancing the pressure prevailing in the gas stream. This counter force may be controllable so as to be used alone or in combination with a member controlling the gas stream for adjusting the idling speed. The member controlling the gas stream for adjusting the desired idling speed may be a throttle valve provided in the outlet duct of the motor.

Figure 4A:
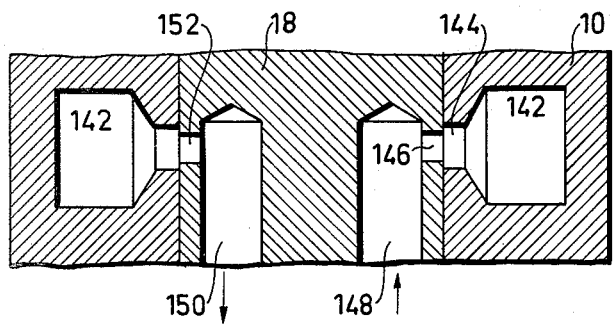

Additional characteristic features of the invention and advantages obtained thereby will appear from the following description of embodiment illustrated in the drawings. FIG. 1 is a graph illustrating the torque and power of an air motor without control device as a function of the speed of the motor. FIG. 2 is a schematic general graph corresponding to FIG. 1, but referring to a motor having a control device. FIG. 3 is a longitudinal sectional view of an air-driven motor suitable for dental purposes and comprising a control device according to the invention. FIG. 3a is a cross-sectional view taken along the line 3a—3a in FIG. 3. FIGS. 4 and 4a are cross-sectional and longitudinal sectional views, respectively, diagrammatically illustrating a device for producing an air stream proportional to the speed of a motor according to the invention. FIGS. 5, 6, 7, 8 and 9 are longitudinal sectional views of different embodiments of the control device. FIG. 10 is a cross-sectional view of a detail permitting leakage in a simplified embodiment of an air-driven motor, FIG. 11 part of a corresponding longitudinal sectional view, and FIG. 12 a pintle comprised in FIG. 11 and viewed at right angles to FIG. 11.

In the graph shown in FIG. 1 and representing an air-driven motor without control device a scale denoting the torque M in gram-centimeters is indicated on the left-hand side of the ordinate axis of the graph, whereas the power P of the motor in watts is marked by a scale on the right-hand side of the ordinate axis. The abscissae of the graph represent motor speed in r.p.m. By way of example, curves $M_1$, $M_2$ and $M_3$ indicate variation of the torque with varying speed, and the corresponding power curves are shown for different pressures $p_1$, $p_2$ and $p_3$, the corresponding idling speed being assumed to be 65,000, 50,000 and 30,000 r.p.m., respectively. From FIG. 1 it appears that the speed $n$ is considerably reduced with increasing load torque. Further, on the assumption of an idling speed, for instance 30,000 r.p.m., lower than the maximum speed, that is, 65,000 r.p.m., a greater percentage of speed drop will result. This fact is very unfavourable and means that such a motor is practically unusable within the lower range of speed because of an insufficient out-turn, since the available torque will be too low. As compared therewith, a highly important improvement is obtained if the motor is provided with a control device as will be apparent from FIG. 2 in which curves are illustrated which are very closely ideal in connection with motors for dental purposes. As will be seen from these curves the speed starting from the idling speed, for instance 50,000, 30,000 and 10,000 r.p.m., drops to begin with very moderately with increasing torque as far as to a great power output represented by the dashed limit curve P corresponding to the maximum available inlet pressure of the working medium. The output then follows the curve P down to zero speed. If by way of example, the idling speed is 30,000 r.p.m. and the motor provided with the control device is loaded such that its maximum power is taken off, the speed will drop to 26,000 only, whereas in FIG. 1 the corresponding speed would be 15,000 r.p.m. If attempts were made to take off the same torque as in the above case the motor would stop. In the former case (FIG. 1) the maximum available power 4 watts only, while in the latter case (FIG. 2) it is 22 watts. A further comparison between the power curves illustrated in FIGS. 1 and 2 shows that the motor provided with a control device renders possible a much better utilisation of the limit power corresponding to the maximum pressure. This power is obtained upon a very moderate speed drop, especially in the high-speed range. Within the low speed range, that is, at an adjusted idling speed of 10,000 r.p.m., the limit power curve (FIG. 2) is intersected by the torque curve M not earlier than at zero speed and, consequently, the power corresponding to the limit power curve P is not obtainable. In motors for dental purposes this fact is of no significance per se. The main point is that a sufficiently great torque is available at the lowest speed. It will be seen from FIG. 2 that the same maximum torque of 150 gram-centimeters is available assuming both the lower idling speed of 10,000 and the highest idling speed of 65,000 r.p.m. Consequently, the maximum torque is available even in case of an idling speed as low as 10,000 r.p.m. Another advantage of a motor provided with a control device in accordance with the invention is a high available excess power within a considerable speed range. For instance, if a certain work to be performed, such as by a motor-driven burr-drill, requires a maximum power of 6 watts only, as indicated by the line $Pa$ in FIG. 2, excess power is available at a speed ranging between about 4,000 and 62,000 r.p.m. In case of the power curve for the pressure $p_3$ in FIG. 1 applied to an idling speed of 30,000 the maximum power would not at all be enough, since the peak of the dashed power curve lies in this case at about 3.5 watts.

In the embodiment illustrated in FIGS. 3 and 3a the control device is applied to a motor driven by air under pressure of the known type comprising a rotor 10 having a plurality of cylinder spaces 12 for pistons in the form of balls 14 in engagement with a driven member 16 which annularly surrounds the rotor and the balls. The rotor 10 is mounted for rotation on a pintle 18 which is eccentric or can be adjusted eccentrically with respect to a shaft 20 which is centrally connected to the driven member 16. By means of an antifriction bearing 22, the shaft 20 is mounted in an outer casing 24 which surrounds the shaft 20, the rotor and the driven member. The balls 14 are in locking engagement with the inside of the annular member 16 and are reciprocated inwards and outwards in the cylinder spaces 12 upon rotation of the rotor 10 about the pintle 18 located eccentrically with respect to the shaft 20. The pintle has an inlet duct 26 for air under pressure and an outlet duct 28 for discharged air. During rotation of the rotor, ports 30, 32 in the bearing surface of the rotor on the pintle put the cylinder spaces successively in communication with the inlet duct 26 and the outlet duct 28. During this operation the cylinder space 12 is filled through the port 30 on the inlet side whereupon the cylinder space is closed as the port is covered by the bearing surface of the pintle between the inlet and outlet sides, and the compressed air expands in the cylinder space. Provided that the air is expanded to atmospheric pressure, the amount of air discharged from the cylinders and flowing through the outlet duct 28, will be proportional to the speed of the motor.

The pintle 18 is carried by a hub sleeve 34 of a plate 36 which is displaceably inserted between an end ring 38 secured to the casing 24 and a ring 40 which is actuated by a resilient washer 39 and axially displaceably fits in a shell 42 which is turnable on the casing 24. This arrangement renders possible adjustment of the eccentricity of the pintle 18 relative to the drive shaft 20 as well as reversal of the direction of rotation of the rotor 10. As this arrangement forms no part of the present invention, it is not described in detail.

In order to render possible control of the speed of the motor, an inlet valve for the air under pressure is acted upon by a magnitude responsive to the speed of the motor. In the embodiment illustrated in FIG. 3 the inlet valve is a tubular slide 44 which is axially displaceable on the pintle. The inlet end of the pintle has a central inlet duct 46 which at one end communicates with the inlet duct 26 and near its other end is transversed by a pair of through-bores 48, 50 one on each side of a partition 52 which forms part of the pintle. The transverse bores terminate in annular grooves 54, 56 in the wall of the pintle. These grooves communicate with each other through an annular recess 58 on the inside of the tubular slide 44. If not acted upon by pressure the slide assumes its left-hand end position. The communication can be reduced by displacing the tubular slide 44 to the right in FIG. 1 so that the edge 60 of the recess 58 is moved closer to the partition 52. Inserted into the end of the pintle is an inlet member 62 having a connection piece 64 for a hose or other connection communicating with a source of air under pressure, a coarse filter 63 being provided to prevent foreign matter from entering the inlet.

In the embodiment according to FIG. 3, the pressure of the air discharged from the cylinder spaces through the duct 28 constitutes the magnitude responsive to the speed of the rotor 10. The duct 28 communicates through a discharge port 66 with a hole 68 in the hub sleeve 34. The flow from this hole 68 can be regulated by peripheral displacement of an aperture 70 in a rotary valve relative to the hole 68 so as more or less to cover this hole and to throttle the discharged air stream. The rotary valve comprises a hub sleeve 72 on a radial plate 74 which at the periphery of the outer casing is provided with a fluted flange 76. A washer 78 serving as a friction spring retains the rotary valve in the adjusted position. For fine adjustment of the throttling action the hole 68 has a peripherally tapering portion 79 shown in FIG. 3a. The radial hole 68 communicates through a narrow duct 80 with a chamber 82 on one side of a diaphragm 84, the periphery of which is tightly clamped between the case 86 of the control device and an end plate 88 secured to the hub sleeve 34. At its inner periphery the diaphragm 84 bears tightly on a flange 90 of the tubular slide 44 so as to form, together with the flange 90, a partition between the chamber 82 communicating with the outlet and a chamber 92 provided in the case 86 and surrounding the tubular slide. The last named chamber 92 communicates through an aperture 94 with the ambient air. The force exerted on the diaphragm 84 due to the pressure in the chamber 82 is balanced by a counter force exerted by a spring 96 which is inserted between the flange 90 and a radial flange 98 of the case 86. In the initial position the spring bearing on the flange 98 forces the inner part of the diaphragm against a slotted support ring 99.

Regarding the control device the mode of operation of the motor described is substantially as described below.

The rotor 10 is rotated in known manner due to the torque resulting from the eccentricity of the axis of the rotor with respect to the shaft 20 as soon as air under pressure is admitted into the cylinder space 12 through the duct 26. After expansion in the cylinder space the air is discharged through the outlet duct 28 and the passage formed by the holes 66, 68 and 70. The amount of air flowing through this passage per unit of time is proportional to the speed of the motor. If the air discharged is throttled by corresponding adjustment of the rotary valve 74, 76 a counter pressure will be set up the magnitude of which is also proportional to the speed. This counter pressure is transmitted through the axial duct 80 to the chamber 82 on the rear side of the diaphragm 84 which will tend by means of the flange 90 to displace the tubular slide 44 to the right as viewed in FIG. 3. This movement is counter acted by the spring 96, and the displacement comes to an end when the force exerted by the diaphragm 84 is balanced by the spring force. The motor now rotates at a speed which is determined by the counter pressure on the outlet side, that is, by the position of the rotary valve 74, 76. As a result the idling speed of the motor corresponds to the adjustment of the rotary valve.

In the embodiment illustrated, the hole 68 and its tapering portion 79 is covered, by turning the rotary valve through 80°, from maximum opening position to entirely closed position resulting in a successively increasing throttling of the discharged air stream.

After the rotary valve has been set in position for the desired idling speed, this speed is maintained constant by the control device. The device also acts in a manner such that any change of the adjusted speed will immediately be followed by a corresponding change of supply by means of the tubular slide 44 which tends to prevent continued increase of the change of speed. If the device is appropriately dimensioned it is possible to have the slide respond very quickly. This may be attained, for instance, by using a completely balanced slide valve having a short working stroke. In order to keep the speed as constant as possible, further measures should be taken to prevent irrelevant forces from influencing the control action. For instance, care should be taken to eliminate frictional forces as far as possible. Further, it may be suitable to devise the valve such as to be even dynamically balanced to avoid the influence of flow-responsive forces. In the embodiment illustrated this fact has not been regarded other than by the use of an oversize valve resulting in that the velocities of flow of the compressed air will be so low that detrimental forces on the valve slide are negligible as compared with the control forces. A further example of a control influencing factor worth mentioning is leakage between the inside of the tubular slide 44 and the cooperating bearing surface of the pintle 18 and to the side of the diaphragm 84 which normally is to be acted upon solely by the pressure from the outlet side of the motor. To prevent such leakage, an annular collecting duct 100 may be provided on the inside of the tubular slide between the groove 54 and the end of the tubular slide at the chamber 82. Leaking air is collected in the duct 100 and enters the chamber 92 through a hole 102.

Instead of adjusting the idling speed by means of a controllable restriction in the outlet duct the same effect may be obtained by controlling the counter force exerted by the spring 96, as exemplified in the embodiment illustrated in FIG. 5. In this case, a restriction plate 104 in the outlet duct causes a constant counter pressure at each idling speed in the duct 80 which communicates with the chamber 82. The spring 96 bears at one end on the flange 90 of the tubular slide 44 and at the other end on an adjusting ring 106 which is axially displaceable but not rotatable in the case 86 and has a projecting pin 108 which engages a helical groove 110 on the inside of an operating sleeve 112 which is rotatably but axially non-displaceably mounted on the case 86. If the operating sleeve 112 is adjusted by turning, the ring 106 will be axially displaced due to the engagement of the pin 108 with the groove 110 so as to change the tension of the spring 96. Due to this movement, the axial position of the tubular slide, and, consequently, its position relative to the partition 52 will also be changed resulting in a corresponding variation of the flow area of the slide valve and the pressure of the air supplied to the motor. It will be obvious that due to this arrangement the idling speed can be adjusted and the adjusted speed maintained constant.

As shown in FIG. 6 the diaphragm 84 may be replaced by a piston 85 if desired for constructional or other reasons. In the embodiment illustrated this piston is arranged in a manner similar to the diaphragm and is acted upon, as is the case with the diaphragm on one side by the spring 96 and on its other side by the pressure which through the duct 80 is transmitted from the outlet duct 28 of the motor ahead of the discharge aperture 70 of the rotary valve 74, 76. The periphery of the piston has a tight fit and is slidable on a cylindrical surface formed by the inside of the correspondingly cylindrical case 87. A collecting duct 100 having an outlet 102 for air leaking between the pintle 18 and the tubular slide 44 is provided in the same manner as in the embodiment according to FIG. 3.

From the point of view of stability it is important for the time constants to be sufficiently small and at the same time to provide for a suitably adapted damping of the movements which means that the masses to which motion has to be imparted by the control operation should be small as compared with the available control force and that the volumes should be small both on the inlet and outlet side. Further, the volume of the chamber 82 between the diaphragm or piston and the surrounding case should be small. Appropriate damping can be obtained by suitable dimensions of the duct 80 between the outlet 28 and the chamber 82 such that on given conditions the damping action will be sufficient to maintain the system stable during varying conditions of operation which may be met with. It is not recommendable to induce damping in the form of friction of the valve slide, since such friction would manifest itself in the form of lost motion in the control train with resulting difficulties of stabilization. With suitable dimensions, damping in the form of throttling does not result in such an effect. Damping of a similar type can be obtained on the opposite side of the diaphragm or piston by closing the chamber 92 entirely except for a connection to atmosphere through a narrow appropriate duct. For instance, the hole 94 may be replaced by such a duct. At the movement of the diaphragm or piston air will be forced in or out through this duct resulting in losses and, consequently, damping. In this case it may be suitable to pass the leaking air from the groove 100 and the hole 102 directly to atmosphere such as by means of a suitable pipe connection, in order to avoid influence of the leakage upon the damping action. If the measures described are applied to the embodiment according to FIG. 3 it is easy to fulfill all requirements as to stability and also to make sure of a high accuracy of speed.

It will be obvious that the valve serving as a multiplicator may be replaced by a multistage multiplicator comprising valves acting upon each other to obtain a higher multiplication, and consequently, a higher accuracy of speed. Such a multiplicator may be associated, in a manner known per se, with restoring means for securing adequate stability.

In the embodiments hitherto described the control device is constructed such that the idling speed is adjusted manually by turning a rotary valve (72, 74, 76 in FIG. 3) or a ring for adjusting the counter force acting upon the diaphragm 84 or the piston 85 and embodied, for instance, by the spring 96, but instead thereof the control device may be of the remote control type. This is of considerable advantage in connection with motors for dental purposes, where the motor with appertaining tool is held in one hand in operation, while the speed can be controlled by the other hand or by means of a pedal. An example of a device having a remote control throttle valve in the outlet is illustrated in FIG. 7. Here, the throttle valve consists of an annular piston 114 which is actuated in the opening direction by a spring 116. The outlet hole 68 in the hub sleeve 34 terminates in an annular groove 69 in the hub sleeve. This groove in which the discharged air is distributed when leaving the motor has a bevelled edge 71 where the air is discharged at the outlet edge of the annular piston 114. This arrangement renders possible fine adjustment of the throttling action on the discharged air. The annular piston 114 fits displaceably in a cylinder 118 formed by the wall 88 of the diaphragm case. In this wall there is also provided a duct 120 in communication with a hose connection 122 for the supply of a gaseous medium under pressure via the duct 120 to a cylinder space 123 behind the annular piston 114. If the pressure in the hose connection 122 is increased by manipulation of an operating member, not shown, associated with the connection, the annular piston 114 will be displaced toward the left in FIG. 7 against the action of the spring 116 so that the annular duct will be entirely closed or remain closed, whereas upon reduction of the pressure the annular piston will be moved to the right in FIG. 7, by the spring 116 so as gradually to open the annular duct 69. As in the embodiment described with reference to FIG. 3, the pressure variations are transmitted through the duct 80 to the chamber 82 behind the diaphragm 84 resulting in that the tubular slide 44 will be adjusted to control in a corresponding manner the supply of medium under pressure to the inlet duct 26 of the motor.

Among other things the embodiment shown in FIG. 7 offers the advantage that in spite of the remote control the volume on the outlet side is not increased and that difficulties as to stability are avoided thereby.

In FIGS. 7 and 9 the counter force acting on the diaphragm 84 is obtained due to the fact that the slide 44 is not balanced with respect to the pressure of the inlet air which here acts on a shoulder 124 which is obtained by replacing the groove 58 by an enlarged diameter bore 126 extending to the right-hand end of the slide. A disk spring 127 acts upon the slide in the opposite direction at the left-hand end.

In the embodiment illustrated in FIG. 8 the counter force balancing the pressure in the chamber 82 is provided by a pneumatic spring instead of the mechanical helical spring shown in FIG. 3. The pneumatic spring is represented by the air cushion obtained due to the fact that the chamber 92 is closed. In other words, the aperture 94 communicating with the atmosphere according to FIG. 3 is stopped up. Leaking air can be directly discharged to atmosphere from the annular groove 100 in the tubular slide 44 in the manner described below.

The throttle valve in the outlet duct of the motor which in the embodiments described above has been assumed to be provided in the motor itself on the hub sleeve 34 may instead thereof be disposed in an extension of the outlet duct at any desired location remote from the motor. Such disposition of the throttle valve remote from the motor requires consideration of the resulting increased volumes on the outlet side which may be accomplished by appropriate dimensions of the control device so as to secure satisfactory stability. The force acting on the rear side of the diaphragm against the outlet pressure of the motor can be adjustable otherwise than by means of an adjustable spring, such as in FIG. 5, namely, by means of a controllable gas pressure in the chamber 92 on the front side of the diaphragm such that the idling speed is adjustable by control of this pressure. If desired, a non-controllable mechanical spring like the spring 96 may be used in combination with the controllable pressure. An example of a controllable counter pressure with the use of a gas pressure is illustrated in FIG. 8. Here, the chamber 92 around the tubular slide 44 has an opening for a hose connection 128 communicating with a source of compressed air, not shown. Instead of the diaphragm 84 there are provided two diaphragms 130 which at their peripheries are clamped between the parts 88 and 86 of the diaphragm case and an intermediate ring 132 having a vent hole 134. The space 136 between the diaphragms 130 serves the purpose of venting leaking air which is collected in the duct 100 and flows through the hole 102 in to this intermediate space. The tubular slide 44 has a radial flange 91 against which the radially inner ends of the diaphragms 130 abut as tightly as possible. Air which may leak from the chambers 82 and 92 on either side of the diaphragms 130 to the space 136, between the diaphragms can also be vented through the holes 134 in the ring 132. Inserted in the hole 68 communicating with the outlet duct 28 is a restriction plate 104 for constant throttling of the discharged air. As in the previous embodiments the pressure of this air is transmitted through a duct 80 to the chamber 82. Air under pressure can be supplied to the connection 128 via a throttle valve from the source of pressure which drives the motor through the inlet duct 46 or from another source of pressure.

The mode of operation of the embodiment illustrated in FIG. 8 is generally the same as that described with reference to the previous embodiments. For instance, if the pressure of the air in the connection 128 and in the chamber 92 is increased, the diaphragm 130 of this chamber will be subjected to an increasing force which displaces the tubular slide 44 to the left in FIG. 8 and increases the passage through the duct 58 past the partition 52. As a result, air at a higher pressure will be admitted to the inlet duct 26 of the motor. At the same time, the speed of the motor and, consequently, the pressure in the outlet 28, 68 will be increased with the result that the diaphragm 130 facing the chamber 82 will be acted upon, through the duct 80, by an increasing pressure which balances the force acting on the opposite side. The tubular slide will come to a rest in a position which corresponds to the increased operating force applied through the hose connection 128.

As indicated by chain-dotted lines in FIG. 8, the hose connection 122 or 128 in FIG. 7 or 8 may be connected for control purposes to a branch pipe 129 which at one end is provided with a throttle valve 131, such as an asbestos disk inserted in a tube, which is connected to the air pressure inlet of the motor or to another source of air under pressure and adapted to admit a small amount of air per unit of time, whereas the other end of the branch pipe is open to atmosphere and comprises a control valve 133 for adjusting the speed of the motor.

Measures other than described above may be taken to obtain a magnitude which represents the speed of the motor. As to the above measures it is taken for granted that the air is expanded to atmospheric pressure before the respective cylinder space is connected with the outlet duct of the pintle. If complete expansion does not occur this will be at the expense of the accuracy of speed representation.

An improvement in this respect can be obtained by providing the pintle 18 and/or the rotor 10 and/or the pistons with ducts for quick-emptying the cylinder 12 immediately before it is connected to the outlet duct. An example of such a quick-emptying arrangement is illustrated in FIGS. 10, 12. In FIG. 10, a piston 14a is shown in its inner end position and a piston 14b in its outer end position in the respective cylinder 12. A leakage duct 138 in the form of an axial groove in the pintle 18 is in the position shown in FIG. 10 in register with the port 30 of the cylinder 12, the piston 14b of which is in its outer dead position. In this position, leaking air passes through the axial duct 138 to the end of the pintle where it can be suitably discharged. The direction of flow of the leaking air is indicated by an arrow 140 in FIG. 12. As in the previous embodiments, numerals 26 and 28 denote the inlet and outlet duct, respectively, in the pintle 18. Due to the leakage arrangement the expansion period is made use of as far as possible and a true representation of the speed is obtained. A true representation of the speed requires of course equal pressures in the various cylinder spaces when they are assuming equal positions around the pintle, that is, at the moment when a cylinder space is connected to the outlet side. In this case, the amount of air passing on the outlet side will be proportional to the speed, provided that leakage is negligible or relatively constant at different speeds or that the fault due to the leakage is compensated for. The desired representation of the speed can also be obtained if the cylinder at the above named moment immediately prior to its communication with the outlet side via suitable ducts is connected to a source of pressure of predetermined constant pressure. In this case, the system can easily be dimensioned and devised such that the overall efficiency of the motor will not be lowered.

In order to obtain an amount of air stream per unit of time corresponding to the speed of the motor with a view to producing the speed-sensitive magnitude for controlling the speed, a device similar to a cellular wheel may be used through which air at a certain constant pressure is passed over. According to the most simple arrangements, the rotor 10 itself may be used as a cellular wheel device, but it is of course possible to connect a separate device of this kind to the rotor. FIGS. 4 and 4a illustrate an example of the first named arrangement. The rotor 10 has a plurality of cavities 142 of preferably equal size which are not connected to any of the cylinders of the rotor. A duct 144 connects each cavity 142 to the bearing surface of the rotor on the pintle 18. The pintle has an opening 146 in communication with an axial duct 148 which communicates with a source of pressure of predetermined constant pressure. The pintle also has an axial duct 150 with an opening 152 that terminates in the surface of the pintle. The duct 150 is intended to communicate with the control device, for instance with the duct 80 of this device. When the opening 144 of a cylinder space 142 comes into communication with the opening 146 of the pressure duct 148 a certain amount of air at a constant pressure will enter the cylinder. Upon rotation of the rotor 10 in the direction indicated by the arrow 154 in FIG. 4 to a position in which the duct 144 of the cylinder 142 communicates with the opening 152 communicating with the axial duct 150 in which the pressure is lower, a quantity of air corresponding to this lower pressure will be discharged through the duct 150. In this manner a predetermined amount of air at a certain pressure will pass over from the inlet duct 148 to the outlet duct 150 during each revolution. The amount of air delivered to the duct 150 per unit of time is a measure of the speed and can be converted, via the restriction in the outlet duct of the motor or in another duct communicating therewith, into a pressure for actuating the control device in proportion to the speed. The device illustrated in FIGS. 4 and 4a is small and simple and offers the additional advantage that disturbing leakage can be eliminated. The cavities 142 are preferably equally spaced apart in the rotor so as to balance the pressure responsive forces acting between the rotor and the pintle. These cavities may suitably consist of a pair of diametrically opposite cylinder spaces from which the ball-shaped pistons have been removed and which have been stopped up at their outer ends.

For the purpose of controlling the speed of the motor described it is also possible to use a separate compressor or pump which is driven by the main motor. This compressor or pump may be of the same type as the motor described but can be smaller than the main motor because it has to be devised merely for the power required by the control device. However, in connection with small air motors, such as for dental purposes, having a limited overall size the previously described speed-representing devices have distinct advantages in practical service.

The embodiments and modifications thereof described are examples only of the invention. Various combinations thereof are conceivable within the scope of the invention. The embodiments illustrated are substantially suited to motors for dental purposes where a wide control range is desired. In an embodiment tested in practical service it has proved possible to vary the idling speed continuously from 4,000 up to 55,000 r.p.m. with completely satisfactory properties regarding constancy of speed and maximum output torque and it was possible to adjust the speed in the proportion of 14:1.

The above described constructions of motors driven by a gaseous medium under pressure may be used, with corresponding changes, for motors driven by a liquid. The inventive idea is applicable not only to rotary machines but also to machines for reciprocating tools.

While in the embodiments illustrated the control device has been assumed to be directly combined with the motor, it may be devised as a separate unit suitably connected to the ducts of the motor.

What is claimed is:

1. A gas-operated piston motor having an inlet duct and an inlet valve for controlling the flow of gas under pressure through the inlet duct for the operation of the motor and an outlet duct for gas escaping from the motor, a valve actuator for said inlet valve, said valve actuator comprising an expansible chamber fluid motor having an annular piston that surrounds said inlet duct, at least a portion of said piston being movable with said inlet valve, constriction means in said outlet duct for maintaining in said outlet duct a superatmospheric pressure that varies as the speed of the motor, means for applying said superatmospheric pressure to said valve actuator to urge said inlet valve toward closed position with a first force, means yieldably acting on said valve actuator to urge said inlet valve toward open position with a second force opposed in direction to said first force, and means for adjusting one of said constriction means and said yieldably acting means to alter the ratio of the magnitudes of said first and second forces relative to each other, thereby to adjust and to maintain constant the idling speed of the motor.

2. A fluid motor as claimed in claim 1, said inlet valve comprising a tubular sleeve encompassing said inlet duct.

References Cited by the Examiner
UNITED STATES PATENTS

| | | | |
|---|---|---|---|
| 1,300,706 | 4/1919 | Duby | 91—204 |
| 1,518,851 | 12/1924 | Hutchison | 91—204 |
| 2,425,244 | 8/1947 | Jeffries | 103—123 |
| 2,433,220 | 12/1947 | Huber | 103—40 |
| 2,916,999 | 12/1959 | Christenson | 103—40 |

SAMUEL LEVINE, *Primary Examiner.*

FRED E. ENGELTHALER, *Examiner.*

P. E. MASLOUSKY, *Assistant Examiner.*